US008826938B2

(12) United States Patent
Moore

(10) Patent No.: US 8,826,938 B2
(45) Date of Patent: Sep. 9, 2014

(54) DIRECT METAL LASER SINTERED FLOW CONTROL ELEMENT

(75) Inventor: Jason M. Moore, Fountain Valley, CA (US)

(73) Assignee: Control Components, Inc., Rancho Santa Margarita, CA (US)

( * ) Notice: Subject to any disclaimer, the term of this patent is extended or adjusted under 35 U.S.C. 154(b) by 692 days.

(21) Appl. No.: 12/018,088

(22) Filed: Jan. 22, 2008

(65) Prior Publication Data

US 2009/0183790 A1 Jul. 23, 2009

(51) Int. Cl.
 *F16K 47/08* (2006.01)
 *B22F 5/10* (2006.01)
 *B22F 3/105* (2006.01)

(52) U.S. Cl.
 CPC ............... *F16K 47/08* (2013.01); *B22F 5/106* (2013.01); *B22F 3/1055* (2013.01)
 USPC .................................................. 137/625.37

(58) Field of Classification Search
 USPC ........................................ 137/625.33–625.39
 See application file for complete search history.

(56) References Cited

U.S. PATENT DOCUMENTS

| | | | |
|---|---|---|---|
| 3,537,713 A | 11/1970 | Matthews | |
| 3,908,698 A | 9/1975 | Baumann | |
| 3,971,411 A * | 7/1976 | Baumann | 137/625.3 |
| 4,944,817 A * | 7/1990 | Bourell et al. | 264/497 |
| 5,390,896 A * | 2/1995 | Smirl | 251/127 |
| 5,687,763 A | 11/1997 | Steinke | |
| 6,066,285 A * | 5/2000 | Kumar | 264/439 |
| 6,095,196 A * | 8/2000 | McCarty et al. | 138/42 |
| 6,161,584 A * | 12/2000 | Hemme et al. | 137/625.37 |
| 6,657,155 B2 * | 12/2003 | Abe et al. | 219/121.6 |
| 6,701,957 B2 * | 3/2004 | McCarty et al. | 137/625.3 |
| 6,782,920 B2 * | 8/2004 | Steinke | 137/625.3 |
| 6,951,295 B1 | 10/2005 | Gaus et al. | |
| 7,070,734 B2 * | 7/2006 | Liu et al. | 419/6 |
| 7,115,336 B2 * | 10/2006 | Revol | 429/434 |
| 7,255,830 B2 * | 8/2007 | Abe et al. | 419/58 |
| 2005/0016604 A1 * | 1/2005 | Steinke et al. | 137/625.3 |
| 2005/0199298 A1 | 9/2005 | Farrington | |
| 2007/0017584 A1 * | 1/2007 | Shea | 137/625.3 |
| 2007/0163114 A1 | 7/2007 | Johnson | |

OTHER PUBLICATIONS

PCT/US2008/86884. Search Report and Written Opinion. 8 pages.

* cited by examiner

*Primary Examiner* — John Fox
(74) *Attorney, Agent, or Firm* — Stetina Brunda Garred & Brucker

(57) ABSTRACT

A flow control element comprises a cylindrical element body having a bore formed therethrough. The cylindrical element body may include inner and outer peripheral surfaces and define a plurality of tortuous flow passages which extend between the inner and outer peripheral surfaces. The flow control element is formed as a unitary structure wherein the flow passages are oriented along at least two axes. The flow control may be formed by direct to metal laser sintering wherein successive layers of powdered metallic material are solidified by applying laser energy to the selected portions until the flow element is formed as a unitary structure with a plurality of flow passages extending therethrough. The laser energy is selectively applied to the powdered metallic material according to a computer model of the flow control element.

18 Claims, 6 Drawing Sheets

DIRECT METAL LASER SINTERED FLOW CONTROL ELEMENT

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates generally to fluid control and, more particularly, to a throttling device or flow control element adapted for reducing the velocity of fluid flowing therethrough and which may be economically mass produced with a plurality of multi-axis internal flow passages. The flow control element is formed as a high strength unitary structure by direct metal laser sintering of successive layers of powdered material such that the multi-axis flow passages can be formed with highly complex geometries.

An exemplary application into which the flow control element may be integrated is similar to that which is disclosed in commonly owned U.S. Pat. No. 5,687,763. The '763 patent discloses a fluid control device including a valve structure having a flow control element disposed therewithin. An axially movable valve plug is slideably mounted within the interior of the valve housing. The flow control element disclosed in the '763 patent is comprised of a stack of annular disks that collectively define a series of substantially radially directed passageways extending between the inner and outer radial surfaces or edges of the disks. Each of the substantially radially directed passageways has a plurality of right angle turns formed therewithin in order to reduce the velocity of fluid that is flowing through the flow control element.

As disclosed in the '763 patent, the individual disks may be formed with partial or complete passages. Abutting or adjacently disposed disks having partial passageways may cooperate with one another to fully define the radial passageways of the flow control element. Likewise, abutting disks having complete passages formed in a radial direction may cooperate with adjacent disks stacked above or below in order to fully define the radial passageways of the flow control element. In this regard, the abutting disks act to close off communication of fluid within the passageways of the subject disk by utilizing planar faces of the adjacent disks.

Ideally, the radial passageways are tortuous in nature in that the passageways contain a substantial number of turns in order to reduce the velocity of fluid flowing through the flow control element. As disclosed in the '763 patent, the flow control element may be configured to reduce the velocity of fluid flowing in an inward direction. Alternatively, the flow control element may be configured for reducing the velocity of fluid flowing in an outward direction.

In fabricating such flow control elements, one type of practice to date has been to pre-machine individual hardened disks and then to align and assemble the hardened disks in a stack in order to form the flow control element having the plurality of passageways. The securement of the stack of hardened disks has been either by the use of tension rods, as is shown in the '763 patent, or by the use of brazing materials wherein the bearing surfaces such as the outer peripheral edges of the adjacent disks are brazed together in order to assemble the stack of disks. In the case of tungsten carbide disks or cylinders, the assembled stack may appear as a unitary or one-piece element although the element is actually comprised of multiple disks or cylinders that are brazed or otherwise attached to one another.

One of the advantages of utilizing tungsten carbide to form the flow control element is its superior erosion resistance. Particularly in severe service applications wherein entrained sand may be captured in fluid which flows through a valve assembly, the flow control element must have a very high resistance to erosion from the entrained sand. In this regard, tungsten carbide is the hardest known element with a compressive strength that is greater than that of any other metal or alloy making tungsten carbide well suited for abrasion resistant applications.

However, a significant drawback to the use of tungsten carbide and other materials in a flow control element is the difficulty associated with machining the material due to its extreme hardness. For example, certain alloys such as alloys of stainless steel and tungsten carbide can only be machined by using diamond-grit grinding devices. Furthermore, a substantial cost in using disks of tungsten carbide is the requirement for grinding them flat prior to assembly into the disk stack. The disks must be ground flat in order to ensure proper registry and alignment of the disks in the stack formation in order to prevent a "tacoing" effect wherein disks in the stack may warp. The tacoing effect can also occur when using stainless steel sheet metal with electron discharge machining (EDM) or punching disks.

Warps between adjacent disks may result in gaps between the disks which can allow fluid to escape. The escaping fluid can result in an overall reduction in the energy dissipating capability of the disk stack. In addition, as high pressure fluid flows through gaps between the warped disks, erosion of the adjacent disks can occur which, over time, can further reduce the energy dissipating capability of the disk stack and can compromise the overall performance of the flow control element and, ultimately, the overall control of the valve which could have an effect on the entire system.

In an attempt to overcome the above-noted drawbacks associated with assembling pre-machined disks of hardened material, alternative practices for manufacturing flow control elements have been developed in the prior art, including the use of green state technology. More specifically, in a green state manufacturing process, the flow control element is formed by a series of pre-formed individual annular green state disks fabricated from metallic or ceramic powder mixture (such as stainless steel or tungsten carbide powder mixture) in an unsintered green state. Binder material is added to the powder mixture to aid in permanently bonding particles of the powder mixture during sintering of the green state disks.

The individual green state disks have partial or complete disk passages formed therein. The series of green state disks are assembled in a stacked formation so that the partial or complete disk passages of adjacently-disposed green state disks form the substantially radial device passageways. The partial passages are formed in the disks prior to the assembly of the individual green state disks. The individual green state disks are assembled in the stacked formation prior to the hardening of the disks by heat. The assembled stack of green state disks are sintered or heated as a unit in order to unitize the individual green state disks together into the flow control element.

Although the above-described green state manufacturing process overcomes some of the difficulties associated with the machining and assembly of hardened material, the green state process includes inherent limitations related to the forming of the internal flow passages. More specifically, in some flow control elements, it is desirable to provide highly complex flow paths in the internal flow passages such that the internal flow passages have a plurality of multi-axis right angle turns in order to optimize fluid control characteristics for a given application.

Unfortunately, forming multi-axis flow paths using conventional disk stack technology or using green state technology is either not possible or is extremely expensive due to the required tooling investment and substantial manufacturing and assembly time. Furthermore, fabrication practices using known disk stack technology or using green state technology results in limitations in the overall strength such as in the ability of the disk stack to resist hoop stresses and the limitations of the braze strength. Even further, material waste is relatively high in conventional disk stack technology as a result of the discarding of support material used in the manufacturing process. Conventional brazing operations used in assembling disk stacks also present certain deficiencies related to the clogging or partial blocking of the passageways in the disk and the limitations of the braze strength. As mentioned above, fluid leakage may also occur using conventional disk stack technology as a result of the "tacoing" effect which may arise as a result of wavy or non-planar sheet stock, excessive fluid pressure within the flow control element, or as a result of low quality brazing. The buildup of differential stresses may also occur as a result of heat treating the disk stack subsequent to the stacking of the individual pieces or disks therein.

As can be seen, there exists a need in the art for an improved technique for manufacturing a flow control element of the type that may be used in valve assemblies or fluid control devices. More particularly, there exists a need in the art for a flow control element that can be fabricated with a plurality of complex multi-axis or multi-directional internal flow passages in a unitary structure. Furthermore, there exists a need in the art for a flow control element that can be economically mass-produced with a high degree of accuracy and repeatability and with improved strength properties.

BRIEF SUMMARY OF THE INVENTION

The above-mentioned deficiencies and needs associated with flow control elements of the prior art are specifically addressed and alleviated by various aspects of the invention as disclosed herein. More particularly, in one aspect, the invention includes a flow control element formed by direct metal laser sintering wherein a variety of complex flow passages can be formed in the flow control element. For example, the flow passages can be formed along at least two axes that may each be oriented orthogonally (i.e., perpendicularly) relative to one another although the flow passages may be oriented along any axis or direction relative to one another within the flow control element. The flow passages may each define a plurality of substantially right angle turns in order to reduce fluid velocity through the flow control element. By fabricating the flow control element using the direct metal laser sintering process, the flow control element can be formed as a unitary structure with a high degree of accuracy and with improved strength.

In one embodiment, the flow control element may be fabricated for use in a valve assembly having a reciprocally moveable plug body to allow for selective regulation of fluid flowing therethrough. The flow control element may include a multiplicity of flow passages through which fluid flows generally radially through the flow control element. In one arrangement, the flow control element may comprise a cylindrically shaped element body having a bore formed therethrough that is complimentary to a cylindrical configuration of the plug body. The element body defines inner and outer peripheries and includes a plurality of tortuous flow passages which extend radially between the inner and outer peripheries. However, the flow control element may also be fabricated in conjunction with the valve assembly using the direct metal laser sintering process.

Furthermore, it should also be noted that the flow control element is not limited to cylindrical flow control devices nor is it limited for use with valve assemblies having reciprocating plug bodies. For example, the valve assembly may be configured as a ball valve, a butterfly valve and various other types of flow control devices known in the art. Furthermore, it should be noted that the flow control element is not limited to applications requiring complex multi-axis flow passages but may also be fabricated with single-plane and/or single-axis flow passages. In addition, the flow control element can be configured such that fluid can enter or exit from any surface of the flow control element and can travel along any direction within the volume of the flow control element. In this regard, the direct metal laser sintering allows for precision formation of multi-axis internal flow passages.

The method for fabricating the flow control element using the direct metal laser sintering process may comprise the steps of providing an initial layer of powder material such as metallic material although any suitable material may be utilized. Laser energy may be applied to predetermined portions of the layer of powdered material until the portions solidify. The location at which the laser energy is focused corresponds to a computer model such as a computer aided design model (e.g., SolidWorks®, STL) of the flow control element. Advantageously, the ability to generate a computer model of the flow control element prior to production allows for finite element strength analysis and computational flow dynamics analysis for assessing strength and flow performance of the flow control element. In addition, plastic prototypes may be manufactured as a less expensive alternative to metal mockups for testing purposes. In addition, the ability to form a computer model of the flow control element minimizes or reduces the amount of drawings, paperwork, and processing than is required in conventional manufacturing techniques.

The method of fabricating the flow control element comprises successive applications of layers of powdered material upon which laser energy is directed to certain portions until the flow control element is formed as a unitary structure with a plurality of flow passages. As was mentioned above, each of the flow passages preferably defines a plurality of substantially right angle turns to reduce the velocity of fluid flowing through the flow passages. In this regard, the flow passages may further include the formation of protuberances (i.e., raised elements or speed bumps) which may be oriented generally transversely relative to the direction of fluid flow through the flow passage in order to add further resistance to the flow.

Materials from which the flow control element may be fabricated comprise any suitable variety of powder materials such as metallic powder material. In particular, stainless steel is a preferable material due to its high corrosion resistance and high hardness (e.g., Rockwell hardness). In particular, 17-4 stainless steel may be advantageously used in powdered metallic form in the laser sintering process to fabricate the flow control element. Other materials that are preferable include Inconel, cobalt-chromium, titanium, and DM20 which is a bronze-based proprietary material that may be utilized in powder form in the direct metal laser sintering process. Once unitized in the laser sintering process, the flow control element may be heat treated to further increase the hardness. The resulting flow control element is formed as a high strength unitary structure such that multi-axis flow passages can be economically formed with highly complex geometries.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION OF THE INVENTION

Figure 1:
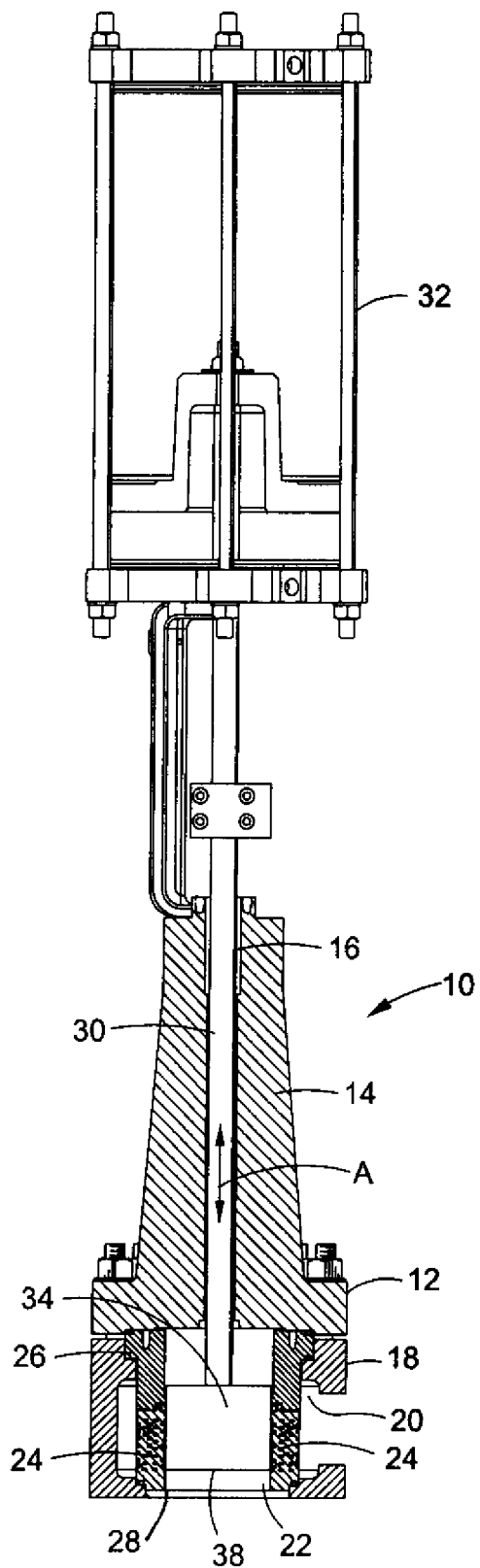
FIG. 1 is a sectional view of a valve assembly within which a flow control element may be employed.

Referring now to the drawings wherein the showings are for purposes of illustrating preferred embodiments of the present invention and not for purposes of limiting the same, FIG. 1 illustrates a valve assembly 10 within which a flow control element 24 may be employed. As will be explained in greater detail below, the flow control element 24 may be formed using direct metal laser sintering of successive layers of powdered material. As distinguished from green state technology wherein the powdered material may be pre-formed into its final shape prior to sintering and unitizing the green state disk stack as described above, the direct metal laser sintering process uses raw powdered material. Laser energy is successively applied to the successively applied layers of raw powdered material in correspondence to a computer model of the flow control element 24. The computer model and, hence, the finished flow control element 24 is formed with a plurality of tortuous flow passages 54 for reducing fluid velocity as well as reducing pressure and kinetic energy as fluid flows through the flow control element 24.

In the sintering process, the powdered metallic material is sequentially applied in thin layers and the laser energy successively solidifies the powdered material. In this regard, successive layers are fused to previously sintered layers until the flow control element 24 is formed as a unitary structure. The direct metal laser sintering process allows for the fabrication of flow control element 24 having complex flow passages 54 oriented along any number of multiple axes. Advantageously, the flow passages 54 may be formed with greatly improved dimensional accuracy at low cost and in a substantially reduced amount of time for certain configurations as compared to current manufacturing practices for flow control elements.

Shown in FIG. 1 is the valve assembly 10 with the flow control element 24 disposed therewithin. The valve assembly 10 is comprised of a valve housing 12 having an upper section 14 and a lower section 18. The lower section 18 defines an interior chamber 20 and a flow opening 22. The flow opening 22 is configured to fluidly communicate with the interior chamber 20. The interior chamber 20 receives fluid therewithin and the flow opening 22 allows the fluid to escape the interior chamber 20.

Disposed within the interior chamber 20 of the valve housing 12 is an annular sleeve 26 and a flow control element 24. The flow control element 24 is captured between the sleeve 26 and the lower section 18 of valve housing 12. The valve assembly 10 may further include a valve plug 34 which is slidably disposed within the flow control element 24. The valve plug 34 is attached to one end of an elongate shaft or stem 30. Both the valve plug 34 and the stem 30 may be generally cylindrically configured although a variety of other configurations are contemplated. It should also be noted that the flow control element 24 and the sleeve 26 may be configured in a variety of alternative shapes, sizes and configurations including forming the flow control element 24 and the sleeve 26 as single element. The valve plug 34 as shown in FIG. 1 may be configured complimentary to the flow control element 24 such that a sliding fit is provided therebetween. It should also be noted that post-processing (e.g. grinding) may be required to provide proper fitment in some circumstances.

As indicated above, attached to the valve plug 34 and extending axially from one end thereof is the stem 30 which is advanced through a bore 16 formed within the upper section 14 of the valve housing 12. The stem 30 is coupled to an actuator 32 which is operative to reciprocally move the valve plug 34 between a closed position and an open position. The actuator 32 may be configured as a piston actuator 32 and, alternatively, may comprise any type of actuator 32 (e.g., air, diaphragm, electronic, hydraulic). The valve plug 34 preferably includes an end face 38 that is disposed opposite that from which the stem 30 extends. The valve plug 34 may be moved between the open and closed positions in alternative directions as indicated by the arrow A shown in FIG. 1. In the closed position, the end face 38 of the valve plug 34 may be placed in sealing engagement with a valve seat 28 disposed within the lower section 18 adjacent the flow opening 22.

As may be appreciated, upon movement of the stem 30 to the open position, the valve plug 34 may be selectively returned to its closed position by movement of the stem 30 in an opposite direction. The engagement of the valve plug 34 to the valve seat 28 effectively blocks the flow of fluid through the flow opening 22. In this manner, the valve plug 34 may be reciprocated along the direction A within the valve assembly 10 such that the flow rate of fluid passing through the valve assembly 10 may be regulated.

In the exemplary configuration shown in FIG. 1, the interior chamber 20 receives fluid that is flowing into the valve housing 12 in a generally radially inward direction from an exterior of the valve housing 12 to an interior thereof. When the valve plug 34 is moved from its closed position toward its open position, fluid is able to flow inwardly through the flow control element 24 and downwardly across the valve seat 28 and through the flow opening 22. In accordance with one possible alternative flow arrangement, when the valve plug 34 is moved from its closed position toward its open position, fluid is able to flow upwardly through the flow opening 22 across the valve seat 28 and into the interior of the flow control element 24, and thereafter outwardly through the flow control element 24 and out of the valve housing 12. In each case, the fluid flows through the flow control element 24 wherein the energy of the fluid is reduced due to the plurality of tortuous flow passages 54 formed in the flow control element 24 as will be described in greater detail below.

Although shown as being incorporated into the valve assembly 10 configuration of FIG. 1, the flow control element 24 may also be incorporated into any number of alternative fluid control devices without departing from the spirit and scope of the present invention. For example, the flow control element 24 may be sized and configured to be disposed within a butterfly valve as is well known in the art. In addition, the valve assembly 10 may be formed simultaneously with the flow control element 24 using the direct metal laser sintering process described herein. In this regard, it is contemplated that the flow control element 24, described in more detail below, may be formed as an integral portion of the valve housing 12.

The flow control element 24 defines the plurality of flow passages 54, each of which defines a tortuous flow path. However, it should also be noted that the flow passages 54 may define relatively non-tortuous flow paths or a combination of tortuous and non-tortuous flow paths. The flow passages 54 are configured for reducing the pressure and velocity of fluid flowing through the flow control element 24. The flow control element 24 may be configured to reduce energy of fluid flowing in either a radially inward direction and/or in a radially outward direction.

Figure 2:
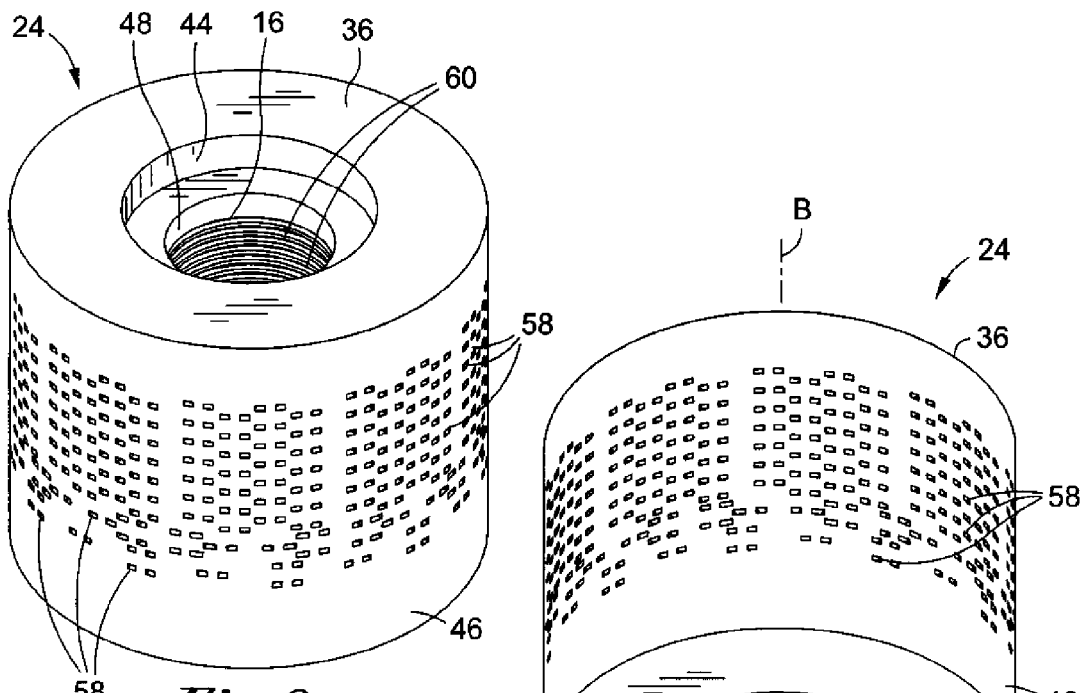
FIG. 2 is a top perspective view of the flow control element configured as a cylindrical element body having a bore formed therethrough.
Figure 2A:
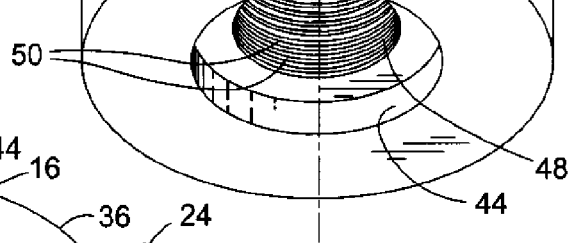
FIG. 2A is a bottom perspective view of the flow control element of FIG. 2.
Figure 3:
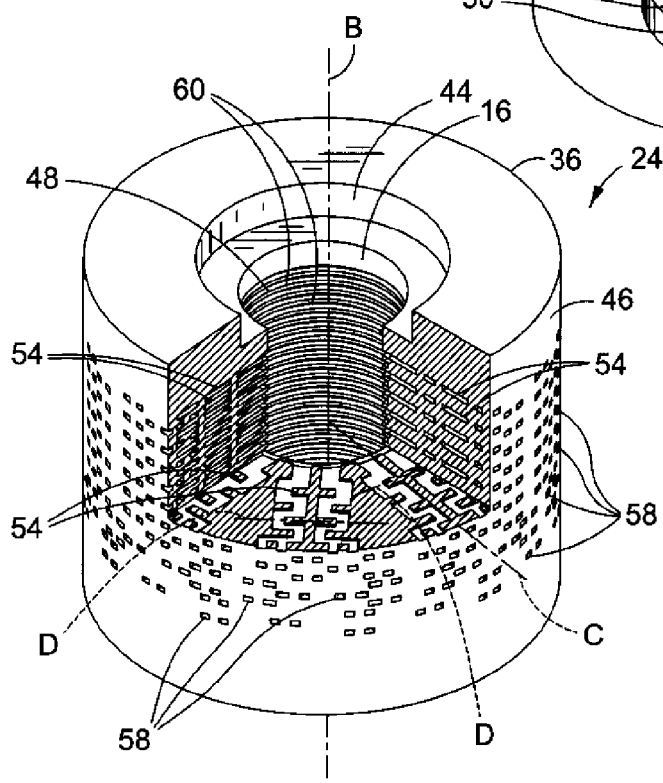
FIG. 3 is a partial cutaway perspective view of the flow control element illustrating a plurality of tortuous flow passages extending radially between inner and outer peripheries of the cylindrical element body.

In FIGS. 2 and 2A, shown is an embodiment of the flow control element 24 in a perspective view and illustrating an arrangement comprising a cylindrical element body 36 having a bore 16 formed therethrough. The element body 36 defines outer and inner peripheral surfaces 46, 48 having the plurality of tortuous flow passages 54 which extend radially therebetween. As was earlier mentioned, the flow control element 24 is formed as a unitary structure with the tortuous flow passages 54 using direct metal laser sintering. In this manner, the flow passages 54 may be formed through the flow control element 24 along any number of axes or any number of directions. For example, the flow passages 54 may be directed along at least two axes which, in one arrangement, may be oriented orthogonally or perpendicularly relative to one another. In a further embodiment, the flow passages 54 may be directed along at least three axes oriented orthogonally relative to one another. Each of the flow passages 54 defines an outer or exterior opening 58 at the outer peripheral surface 46 of the element body 36, and an inner or interior opening 60 at the inner peripheral surface 48 of the element body 36.

For example, as shown in FIGS. 2 and 2A, any one of the flow passages 54 may follow a complex path that directs flow parallel to longitudinal axis B of the flow control element 24 as well as along any one of radial axis C and transverse axis D. However, the flow passages 54 may be arranged such that fluid is directed along a variety of different two-dimensional or three-dimensional directions. As can also be seen in FIGS. 3-7, the flow passages 54 may define a plurality of substantially right angle turns in order to reduce the velocity of fluid flowing therewithin. The flow passages 54 may also be formed along a single plane or a single axis/direction wherein fluid can enter and exit from either the inner and/or outer peripheral surfaces 48, 46 of the body element. In this regard, the flow passages 54 may be formed such that fluid can travel in any direction within the flow control element 24.

Figure 4:
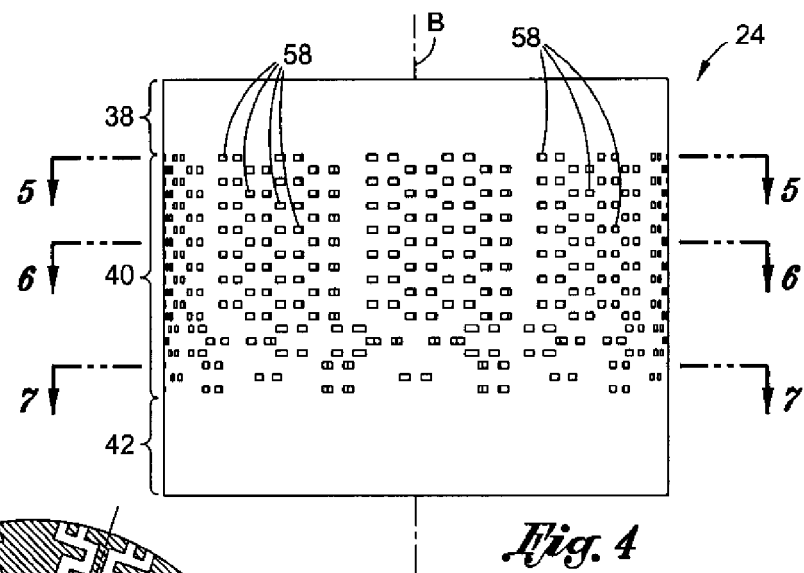
FIG. 4 is a side view of the flow control element illustrating top, intermediate and bottom portions of the cylindrical body element and further illustrating a plurality of exterior openings formed at the outer periphery of the flow control element.

Referring to FIG. 4, shown is the flow control element 24 in a side view illustrating a plurality of exterior openings 58 from which the flow passages 54 exit or enter at the outer or exterior peripheral surface 46. As can be seen, the element body 36 of the flow control element 24 may be divided into a top portion 38, an intermediate portion 40 and a bottom portion 42, although the flow control element 24 may be divided into any number of portions. The top portion 38 as well as the bottom portion 42 may each include an annular step 44 as best seen in FIGS. 2 and 2A. The annular step 44 may be used as a locating mechanism for fixedly positioning the flow control element 24 to the valve seat 28 located within the valve assembly 10. As seen in FIGS. 2, 3, 9 and 10, the interior openings 60 may reside within respective grooves or channels defined within the inner peripheral surface 48 of the bore 16 along the intermediate portion 40 of the element body 36. These grooves or channels, if included, perform a pressure equalization function by minimizing vibration of the valve plug 34 during its travel between the open and closed positions. However, as indicated above, the inclusion of these grooves is optional in the element body 36.

Figure 9:
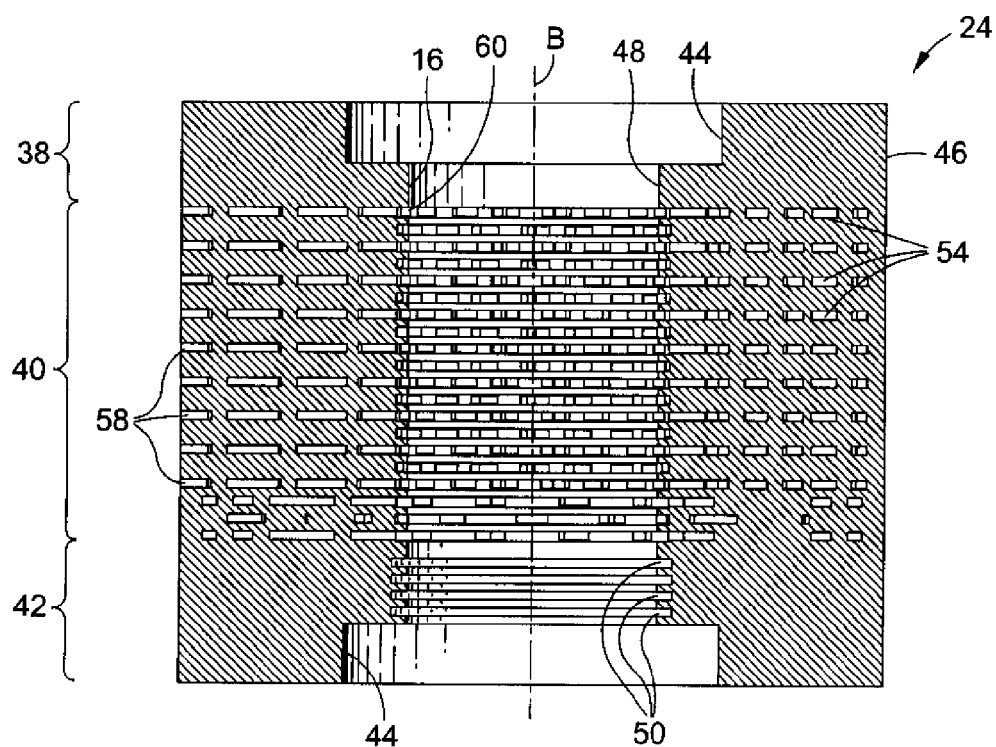
FIG. 9 is a sectional view taken along line 9-9 of FIG. 8 and illustrating a plurality of labyrinth grooves formed in the bottom portion of the body element and further illustrating the flow passages formed in the intermediate portion of the body element.

Referring briefly to FIGS. 2A and 9, the flow control element 24 may further include a plurality of annular labyrinth grooves 50 formed along the inner peripheral surface 48 of the bore 16 of the flow control element 24. As illustrated in FIG. 9, the labyrinth grooves 50 may be vertically spaced along the bottom portion 42 at the inner peripheral surface 48 of the flow control element 24. The labyrinth grooves 50 may be formed at any spacing and in any configuration such as in partial segments or as circumferential grooves as illustrated, and may be provided at the top portion 38 in addition or as an alternative to being provided in the bottom portion 42. The labyrinth grooves 50 may also be formed on an outer peripheral surface 46 of the flow control element 24. The labyrinth grooves 50 may improve fluid regulation at very low flow rates such as when the valve plug 34 of the valve assembly 10 is positioned at the bottom portion 42.

Figure 5:
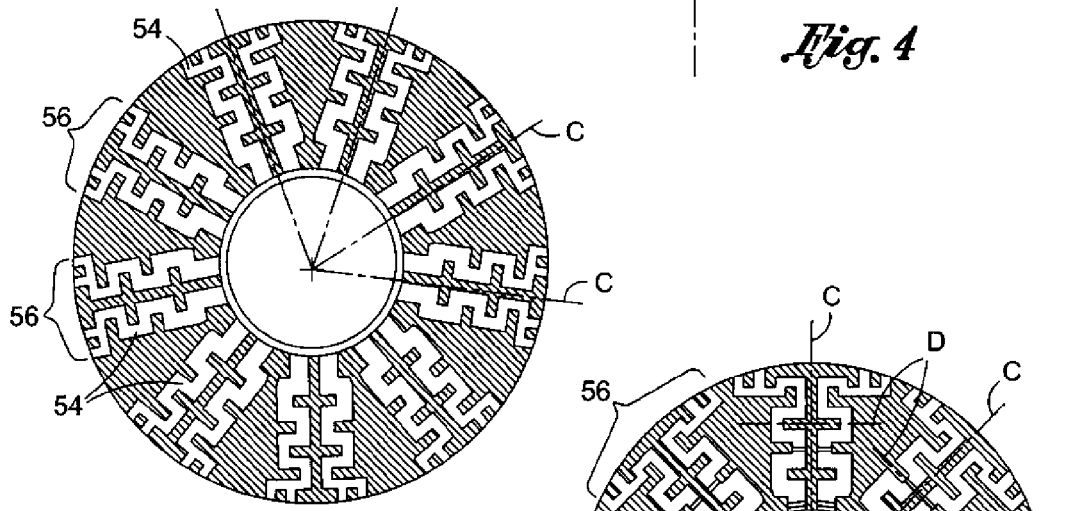
FIG. 5 is a sectional view taken along line 5-5 of FIG. 4 and illustrating one embodiment of radially arranged flow passages formed in the flow control element.

Referring to FIGS. 4-7, shown are various sectional cuts through the flow control element 24 illustrating a variety of passage patterns 56 which may be formed in the intermediate section 40 or in any other portion of the flow control element 24. FIG. 5 illustrates an exemplary arrangement of passage patterns 56 angularly arranged about the flow control element 24. In this regard, FIG. 5 represents an arrangement wherein the flow of fluid through the flow passages 54 is generally along two axes—the fluid flows along radial axis C as well as along transverse axis D while making a plurality of right angle turns as the flow weaves through the flow passages 54. More particularly, FIG. 5 illustrates an arrangement wherein the fluid executes approximately ten right angle turns on each side of a symmetrical passage pattern 56. The pattern 56 is repeated as nine angularly spaced passage patterns 56 each having two flow passages 54 although any number of patterns in any variety of configurations may be provided.

Figure 6:
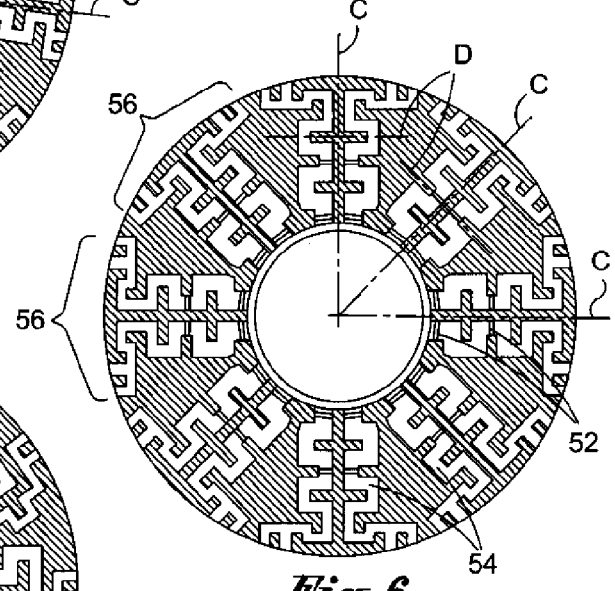
FIG. 6 is a sectional view taken along line 6-6 of FIG. 4 and illustrating a further embodiment of the plurality of radially arranged flow passages.

FIG. 6 illustrates a further embodiment as compared to the embodiment of the flow passages 54 shown in FIG. 5 in that, although the pattern 56 is geometrically similar, the flow passage 54 has an altered geometry at the exterior opening 58 of the flow passage 54. In the passage patterns 56 of FIG. 6, the fluid executes approximately twelve right angle turns along each symmetrical side of the passage pattern 56. The flow passages 54 of FIG. 6 are arranged as eight angularly spaced patterns 56 each having two flow passages 54.

Also illustrated in FIG. 6 is the optional inclusion of a series of protuberances 52 which provide further resistance to fluid flow through the flow passages 54. In this regard, each of the protuberances 52 acts as a type of speed bump in that the flow is directed temporarily upwardly when passing through the flow passages 54 along the longitudinal axis B. In addition, the protuberances 52 are oriented transversely relative to the direction of fluid flow through the flow passage 54. However, it is contemplated that the protuberances 52 may be oriented in any direction relative to fluid flow such as at a slight angle relative to the flow fluid. Furthermore, the protuberances 52 may be located in any portion of the flow passage 54 and are not strictly limited to formation on the bottom or top surfaces of the flow passages 54. For example, the protuberances 52 could be formed as spikes or studs which extend out from sidewalls of flow passages 54. In this regard, the protuberances 52 may be disposed in any pattern 56 and are not limited to strictly a symmetrical or uniform distribution.

Figure 7:
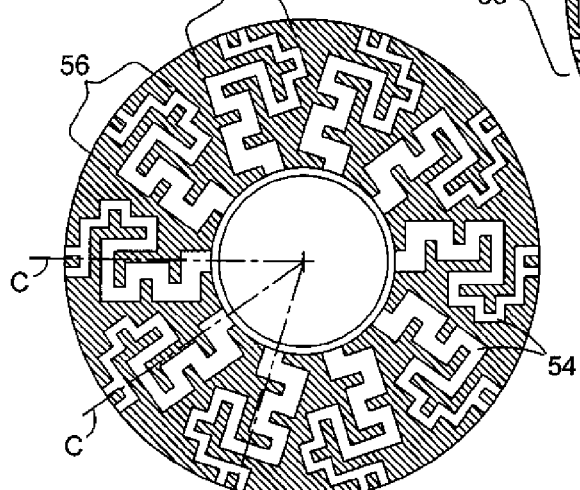
FIG. 7 is a sectional view taken along line 7-7 of FIG. 4 and illustrating a further embodiment of radially arranged flow passages formed in the flow control element.

Referring to FIG. 7, shown is yet a further embodiment of a flow pattern 56 geometry which is shown as ten angularly spaced passage patterns 56. Each of the flow passages 54 illustrated in FIG. 7 is configured such that the fluid must execute approximately sixteen right angle turns from the interior opening 60 of the flow passage 54 to the exterior opening 58 thereof. Although the flow passage 54 configurations illustrated in FIGS. 5-7 are shown as being located within the intermediate portion 40, it should be noted that the flow passages 54 may be formed to extend vertically into the top and/or bottom portions 38, 42. In this regard, it is also noted that the flow passages 54 may be formed in any orientation (i.e., along any axis or variation therefrom). Furthermore, the flow passages 54 may be configured to reduce fluid velocity in any direction and are not limited to fluid flow in the radially outward direction. The flow passages 54 of FIG. 7 are arranged as ten angularly spaced patterns 56 each having a single flow passage 54.

Figure 8:
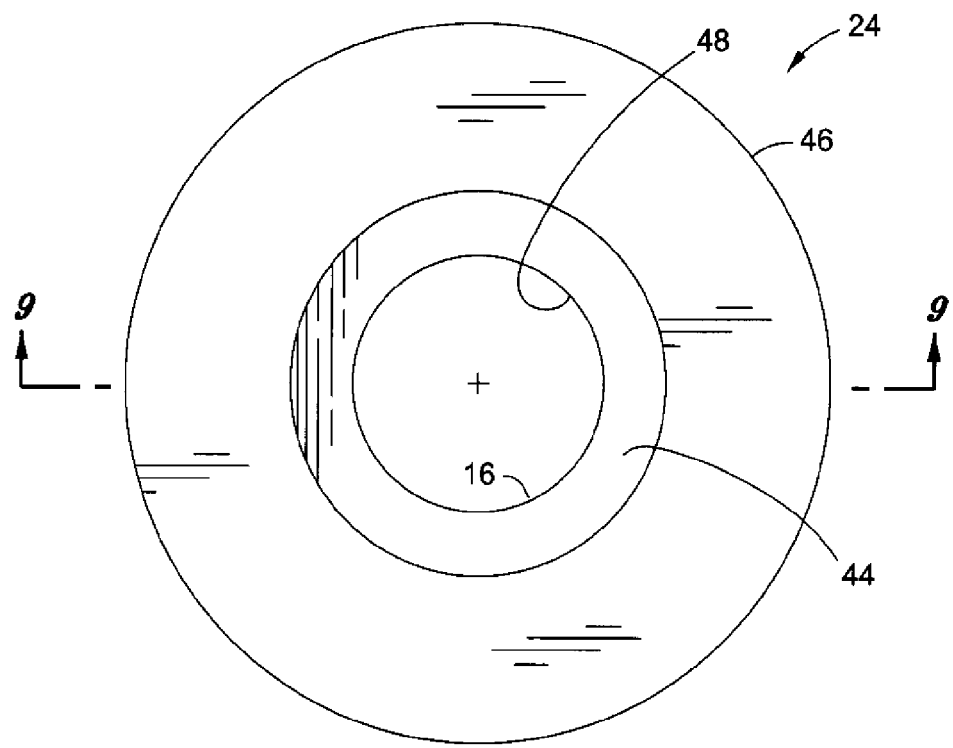
FIG. 8 is a top view of the flow control element illustrating an annular step and a bore formed in the body element.

Referring briefly to FIGS. 8 and 9, shown is the flow control element 24 in a top view (i.e., FIG. 8) as well as in a sectional view taken as a vertical cut through the flow control element 24. In this regard, FIG. 9 illustrates the labyrinth grooves 50 and the relative positioning of the flow passage 54 configurations in the intermediate portion 40. The bottom portion 42 of FIG. 9 illustrates the annular step 44 which is preferably sized and configured to engage the valve seat 28 of the valve assembly 10. In this regard, it should be noted that the valve seat 28 of the valve assembly 10 may be integrally formed with (i.e., via direct metal layer sintering) the flow control element 24. Furthermore, the entire valve assembly 10 may be formed using direct metal laser sintering including formation of the valve plug 34 and flow control element 24, as was also mentioned above.

Referring still to FIG. 9, shown in the intermediate portion 40 of the flow control element 24 are portions of the flow passages 54. As can be seen, the passages 54 are provided with a cross-sectional shape that is orthogonal in nature. However, it should be noted that the cross-sectional shape of the flow passages 54 may be provided in any configuration such as in alternative shapes (i.e., square, rectangular, rhombus, triangular, etc.) and/or in a rounded configuration such as in a circular or oval configuration or any derivation thereof.

Figure 10:
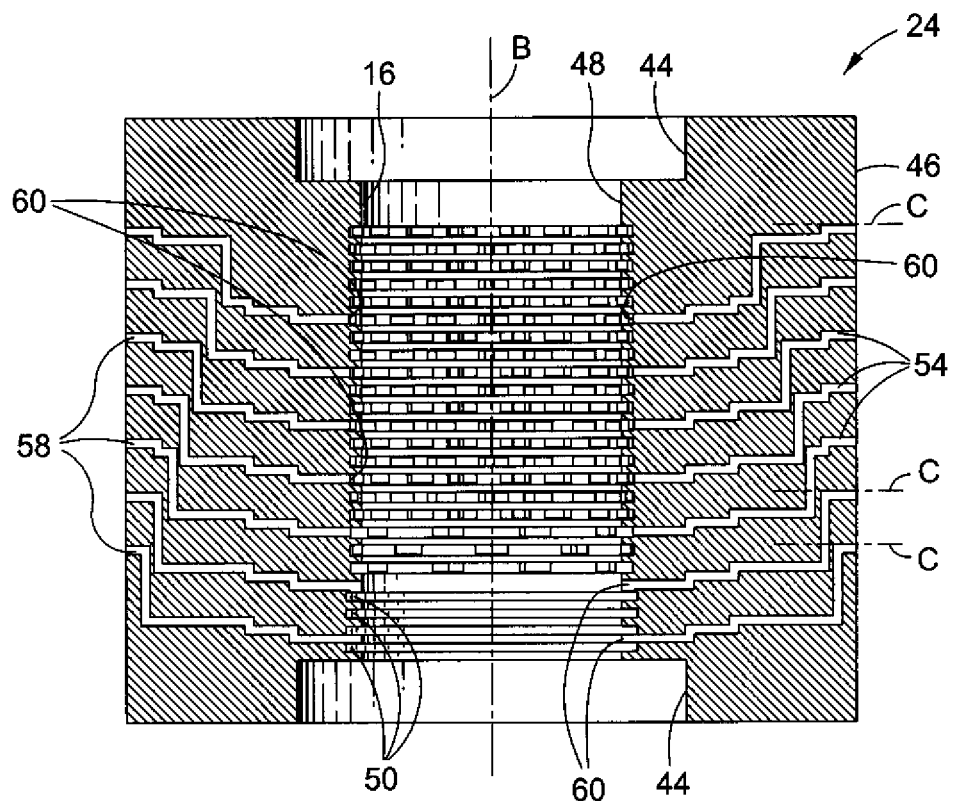
FIG. 10 is a sectional view of the flow control element illustrating an alternative arrangement of the flow passages extending through the body element.

Referring briefly to FIG. 10, shown is the flow control element 24 wherein the flow passages 54 are formed such that at least a portion of fluid flowing through the flow passages 54 travels parallel to the longitudinal axis B (i.e., vertical movement) in addition to travel along the radial axis C. In addition, although not shown in FIG. 10, the flow passages 54 may further allow right angle turns of the fluid along the transverse axes D as the fluid moves from the interior periphery 48 to the exterior periphery 46 of the flow control element 24. However, as was earlier mentioned, the flow control element 24 may be configured such that fluid can flow in either direction (i.e., radially inwardly or radially outwardly). Furthermore, the flow control element 24 may allow for a substantial vertical (i.e., along the longitudinal axis B) direction flow through the flow control element 24 for certain applications.

The flow passages 54 may include an arrangement similar to that illustrated in FIGS. 5-7 wherein the fluid executes a plurality of right angle turns parallel to the radial axis C and/or transverse axis D. Even further, the flow passages 54 may be formed as a variety of different passage patterns 56 that vary along a height of the flow control element 24. For example, as shown in FIGS. 4 and 9, the passage patterns 56 illustrated in FIGS. 5-7 represent three different passage patterns 56 that are formed within the intermediate portion 40 of the element body 36. The flow passages 54 may be formed such that a cross-sectional area thereof generally expands (i.e., increases in cross sectional area) along a direction of fluid flow through the flow passage 54. However, the cross-sectional area through the flow passage 54 may be configured to remain relatively constant and/or decrease from the inner peripheral surface 48 to the outer peripheral surface 46, or vice versa. Moreover, any flow passage 54 may be formed so as to cause the fluid flowing through such passage 54 to be segregated into two streams which impinge each other for an energy dissipation effect. Such impingement can also be achieved by configuring adjacent passages 54 in the appropriate manner.

Figure 11:
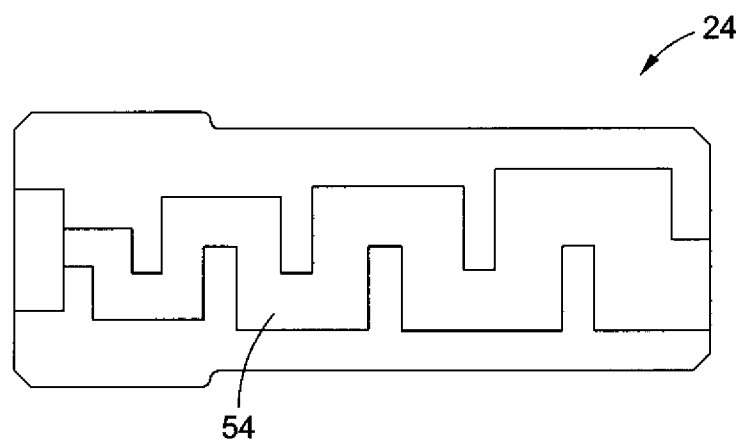
FIG. 11 is a sectional view of an embodiment of a cylindrical flow control element having at least one tortuous flow passage extending in an axial direction through the flow control element.

Referring briefly to FIG. 11, shown is the flow control element 24 configured as a bleed pin and which may be configured as an elongate member and which may be preferably provided in a cylindrical configuration although any configuration or shape is contemplated to be within the spirit and scope of the present invention. The tortuous flow passage 54 as shown in FIG. 11 may extend axially along the flow control element 24 and may be centered therein although other non-centered or offset arrangements for the flow passage 54 are contemplated. The flow passage 54 may be configured to have an expanding cross sectional area from one end of the flow control element 24 to the opposite end as shown although a constant cross sectional area is contemplated. The flow control element 24 shown in FIG. 11 may be provided with a head portion and may optionally include an annular groove. The flow passage 54 may include any number of turns which may be oriented in any direction or along any axis. Furthermore, multiple flow passages may be formed in the flow control element 24 other than the single flow control element 24 shown in FIG. 11.

As was earlier mentioned, the flow control element 24 as disclosed herein may be produced using direct metal layer sintering as the fabrication mechanism. In this regard, the flow control element 24 is first created as a computer model. The computer model includes the flow passage 54 configuration as well as the overall geometry of the flow control element 24. As was also mentioned above, the direct metal laser sintering process allows for fabrication of the flow control element 24 in successive layers of powdered material that are successively solidified to form the flow control element 24 as a unitary structure. Some of the advantages offered by this manufacturing process include higher strength properties, less material waste, minimal tooling requirements, and improved repeatability from part-to-part in a reduced amount of time as compared to conventional processes such as electron discharge machining (i.e., EDM). Post processing requirements as well as rework and testing are also minimized using the direct metal laser sintering process.

Figure 12:
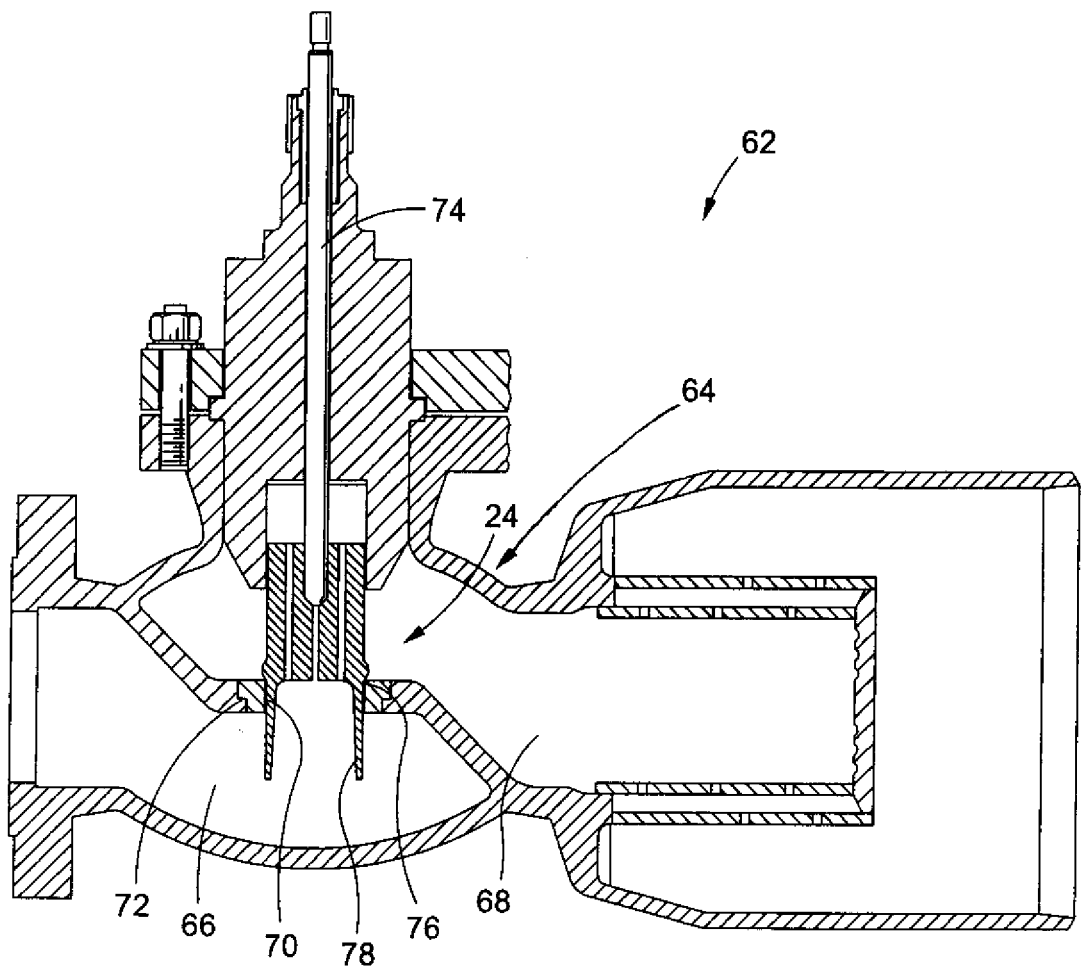
FIG. 12 is a sectional view of a valve assembly within which a flow control element constructed in accordance with a further alternative embodiment of the present invention may be employed.

Referring now to FIG. 12, there is shown a valve assembly having an alternative embodiment of the flow control element 24 configured as a valve plug disposed therewithin. The valve assembly 62 comprises a valve housing 64 which defines an inlet chamber 66 and an outlet chamber 68. The inlet and outlet chamber 66, 68 are placeable into fluid communication with each other via a flow opening 70 which extends therebetween. The flow opening 70 is defined by an annular sealing ring 72 which is attached to a wall which is defined by the valve housing 62 and extends between the inlet and outlet chamber 66, 68.

In the valve assembly 62, the flow control element 24 is selectively movable between open and closed positions relative to the sealing ring 72. The flow control element 24 is attached to one end of an elongate shaft or stem 74 which is in turn coupled to an actuator (not shown). Such actuator is operative to reciprocally move the flow control element 24 between its open and closed positions, the closed position being shown in FIG. 12. When the flow control element 24 is in its closed position, an annular shoulder 76 defined thereby is brought into sealed engagement with the sealing ring 72 in the manner shown in FIG. 12.

In addition to the shoulder 76, the flow control element 24 defines an annular, generally cylindrical skirt portion 78. Though not shown in FIG. 12, disposed within the skirt portion 78 of the flow control element 24 is a plurality of the above-described flow passages 54. In the valve assembly 62, the actuation of the flow control element 24 from its closed position to its open position results in the shoulder 76 being moved upwardly out of sealed engagement with the sealing ring 72. As a result, fluid within the inlet chamber 66 is able to flow into the skirt portion 78 of the flow control element 24, and outwardly through the flow passages 54 thereof into the outlet chamber 68. The flow of fluid through the flow passages 54 effectively dissipates the energy thereof. As described above in relation to other embodiments of the flow control element 24, the flow passages 54 may include any number of turns which may be oriented in any direction or along any axis. As also indicated above, in the context of the valve assembly 62 shown in FIG. 12, the flow control element 24 is generally configured as and provides some of the functionality of a conventional valve plug. The formation of the flow control element 24 shown in FIG. 12 in accordance with the teachings of the present invention is advantageous since a disk stack assembled through the use of conventional disk brazing or bolting methods generally lacks the strength needed for use in the application described in relation to FIG. 12.

The method for fabricating a flow control element 24 generally comprises the steps of providing a layer of powdered material such as metallic material or any other suitable material. Laser energy is applied to specific geometric portions or areas of the layer of powdered metallic material corresponding to the computer model. The laser energy is provided to the layer of powdered metallic material until the portions solidify. A second layer of powdered material is then applied over the sintered layer with laser energy again being applied to specific portions of the second layer until such portions solidify and fuse to the previously sintered layer. The steps are repeated with successive layers of powdered metallic material being sintered using the laser energy until the flow control element 24 is formed as a unitary structure with a plurality of flow passages 54 in correspondence to the computer model.

In one embodiment, the finished flow passage 54 geometry may be oriented at a slight angle or slant relative to horizontal (i.e., approximately 3-5°) in order to prevent formation of artifacts that may otherwise be created. Such artifacts may appear on upper surfaces of the flow passages 54 during the direct metal laser sintering process. Such artifacts may act as impediments to flow of fluid exiting the exterior openings 58. In this regard, such artifacts may have a detrimental effect on the performance of the flow control element 24. However, by forming the flow passage 54 at a slight angle or slant, or with a generally rounded or circular cross-sectional configuration, it is believed that generation of artifacts may be minimized or eliminated.

In the direct metal laser sintering process, the powder is preferably a metallic powder of a suitable composition. For flow control purposes, it is generally desired that the flow control element 24 exhibit high erosion and corrosion resistance. In addition, it is desired that the flow control element 24 exhibit high strength characteristics with relatively high hardness. In this regard, iron-carbon alloys such as stainless steel are preferred materials for use in powdered form in the direct metal layer sintering process. One exemplary stainless steel material includes 17-4 stainless steel which exhibits high strength properties with suitable corrosion resistance for flow control purposes. Another example includes a material commercially known as PHI having mechanical properties similar to that exhibited by 17-4 stainless steel.

Inconel, cobalt-chromium, titanium and a bronze-based material commercially known as DM20 are other materials suitable for use in the direct metal laser sintering fabrication process for the flow control element 24 and/or valve assembly 10. Cobalt chromium may be a suitable replacement for typical Inconel material applications due to its higher specific gravity and improved mechanical properties at elevated temperatures. In this regard, any suitable raw material may be utilized in the direct metal laser sintering process. Ideally, the powder composition is optimized such that after formation, the flow control element 24 requires minimal post processing such as deburring, finishing and heat treating such as annealing.

As was earlier mentioned, flow control elements 24 produced using the direct metal laser sintering process allow for a high degree of part repeatability with relatively small geometric tolerances on the order of 0.001-0.002 inches. Ideally, minimum wall thicknesses are maintained at no less than 0.008 inches to 0.010 inches. Overall dimensions of the flow control element 24 are unlimited but are preferably maintained at approximately ten inches in length by ten inches in width by nine inches in height.

As was earlier mentioned, the method of fabricating the flow control element 24 using direct metal laser sintering process comprises selectively applying laser energy to portions of the powdered material according to the computer model of the flow control element 24. In this regard, the computer model may be provided in any suitable machine readable format. The ability to initially generate the computer model allows for other advantages such as stress analysis using finite element strength analysis techniques as well as flow analysis using computational flow dynamic (CFD) techniques to verify performance prior to production.

A further advantage provided by the direct metal laser sintering process includes the improved strength properties exhibited by the flow control element 24, particularly with regard to high resistance to hoop stresses (i.e., stress in the circumferential direction). Other advantages can include greater longitudinal and circumferential bearing area, greater flexibility in geometry of the flow passages 54 without conventional tooling limitations, and improved appearance of the product due to increased dimensional accuracy. Further advantages may include a reduced diaphragm loading and higher flow rate per unit stroke of the plug body.

The utilization of direct metal laser sintering for fabricating the flow control element 24 and/or the valve assembly 10 includes numerous advantages including improvements in cost reduction and reductions in fabrication time as compared to traditional manufacturing practices such as high speed (e.g., CNC) machining or plunge-style electron discharge machining (EDM). The flow control element 24 allows for a greater precision in control of the flow rate through the flow control element 24 due to a greater control over the tolerances and geometry of the flow passages 54. Elimination of dead band (i.e., non-linear response to movement of the plug body within the flow control element 24) is a further improvement provided by the direct to metal laser sintering process. The inclusion of protuberances 52 within the flow passages 54 can improve resistance to flow and increase the performance of the flow control element 24.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A flow control element comprising:
   an element body having a bore formed therethrough and defining inner and outer peripheral surfaces with a plurality of tortuous flow passages extending radially from the inner peripheral surface to the outer peripheral surface;
   wherein:
   the flow control element is configured as a unitary structure consisting essentially of laser sintered layers of powdered material independent of a plurality of stacked disks;
   each of the flow passages extends through the flow control element along at least two axes; and
   the flow passages are formed such that at least one of the flow passages defines a first passage pattern having a first number of right angle turns in a first radial cross section of the element body, and at least one of the flow passages defines a second passage pattern having a second number of right angle turns differing from the first number in a second radial cross section of the element body different from the first radial cross section.

2. The flow control element of claim 1 wherein each of the flow passages extends through the flow control element along at least three axes.

3. The flow control element of claim 1 wherein the axes are oriented orthogonally relative to one another.

4. The flow control element of claim 1 wherein at least one of the flow passages include a protuberance oriented substantially transversely relative to a direction of fluid flow through the flow passage.

5. The flow control element of claim 1 wherein the bore includes an inner peripheral surface having at least one annular labyrinth groove extending into the element body from the inner peripheral surface and axially spaced from the plurality of tortuous flow passages.

6. The flow control element of claim 1 wherein:
   the flow control element includes a top portion, an intermediate portion and a bottom portion; and
   the flow passages are disposed within the intermediate portion.

7. The flow control element of claim 1 wherein each of the flow passages has a cross section formed in at least one of an orthogonal and a rounded configuration.

8. The flow control element of claim 7 wherein the flow passage cross section is generally expanding along a direction of fluid flow through the flow passage.

9. A valve assembly including the flow control element as defined in claim 1 comprising:
   a valve housing having the flow control element mounted therewithin such that fluid flowing through the valve housing passes through the flow passages.

10. The valve assembly of claim 9 further comprising:
    a valve plug slidably disposed within the bore of the element body, the valve plug being configured to regulate the quantity of flow passages through which fluid may pass.

11. The flow control element of claim 1, wherein:
    the first passage pattern is associated with a first flow passage having a portion extending from the inner peripheral surface to the outer peripheral surface entirely within a first plane in the first radial cross section;
    the second passage pattern is associated with a second flow passage having a portion extending from the inner peripheral surface to the outer peripheral surface entirely within a second plane in the second radial cross section.

12. A method of fabricating a flow control element comprising the steps of:
    (a) providing a layer of powered metallic material;
    (b) applying laser energy to portions of the layer of powdered metallic material until the portions solidify; and
    (c) repeating steps (a) and (b) with successive layers of powered metallic material until the flow control element is formed as a unitary structure consisting essentially of sintered layers of powdered material with a plurality of flow passages formed therein and extending radially from an inner peripheral surface to the outer peripheral surface, the flow passages being formed such that at least one of the flow passages defines a first passage pattern having a first number of right angle turns in a first radial cross section of the flow control element, and at least one of the flow passages defines a second passage pattern having a second number of right angle turns differing from the first number in a second radial cross section of the flow control element different from the first radial cross section.

13. The method of claim 12 wherein step (b) comprises selectively applying laser energy to portions of the powdered metallic material according to a computer model of the flow control element.

14. The method of claim 12 wherein step (c) comprises forming the flow control element such that at least one of the flow passages includes a protuberance oriented substantially transversely relative to a direction of fluid flow through the flow passage.

15. The method of claim 12 wherein step (c) comprises forming the flow control element to include an inner peripheral surface having at least one annular labyrinth groove extending into the unitary structure from the inner peripheral surface and axially spaced from the plurality of flow passages.

16. The method of claim 12 wherein step (c) comprises forming the flow control element to include a top portion, an intermediate portion having the flow passages disposed therein, and a bottom portion.

17. A flow control element comprising:
an element body having a plurality of tortuous flow passages, each of which extends therethrough along at least two axes, the flow passages further being formed such that at least one of the flow passages defines a first passage pattern having a first number of right angle turns in a first radial cross section of the element body, and at least one of the flow passages defines a second passage pattern having a second number of right angle turns differing from the first number in a second radial cross section of the element body different from the first radial cross section;
wherein:
the element body is formed of successively applied layers of raw powdered material, the layers being successively sintered to unitize the element body; and
the element body is formed independent of a plurality of stacked disks.

18. The flow control element of claim 17 wherein the flow passage of the flow control element extends along at least three axes oriented orthogonally relative to one another.

* * * * *